United States Patent

[11] 3,582,680

[72] Inventor Michael Slavin
Baltimore, Md.
[21] Appl. No. 781,546
[22] Filed Dec. 5, 1968
[45] Patented June 1, 1971
[73] Assignee The Bendix Corporation

[54] VARIABLE IMPEDANCE CIRCUIT
2 Claims, 2 Drawing Figs.

[52] U.S. Cl. 307/235, 307/237, 328/150, 325/46, 325/473, 325/478, 325/413
[51] Int. Cl. H03k 508/18
[50] Field of Search 325/46, 344, 348, 473, 478, 4 B; 307/231, 5, 242, 253; 328/115, 150; 330/40

[56] References Cited
UNITED STATES PATENTS

| | | | |
|---|---|---|---|
| 3,262,063 | 7/1966 | Kleinman | 330/40 |
| 3,177,377 | 4/1965 | Brown | 325/478 |
| 3,231,823 | 1/1966 | Garfield et al. | 325/473 |
| 3,288,930 | 11/1966 | Johnson | 325/46 |

*Primary Examiner*—Richard Murray
*Assistant Examiner*—Peter M. Pecori
*Attorneys*—Plante, Arens, Hartz, Hix & Smith, Bruce L. Lamb, William G. Christoforo and Lester L. Hallacher

ABSTRACT: This invention describes a circuit having a variable impedance which varies in accordance with the input signal level. The inventive circuit is used in conjunction with the deemphasis circuit ordinarily employed in FM and other types of radio receivers. By varying the impedance between the output of the deemphasis circuit and the ground, the sensitivity of the audio frequency stage of the receiver is automatically varied. The variation in sensitivity increases the receiver's ability to reject interference and weak signals. The inventive circuit includes two parallel impedance paths connected between the output of deemphasis circuit and the ground reference. The first path is a fixed impedance path and the second contains a voltage sensitive switch. The impedance of the second path is a function of the current through the voltage sensitive switch and therefore the receiver sensitivity varies directly with the variation in current through the switch when the switch is in a conductive condition.

INVENTOR
MICHAEL SLAVIN

BY [signature]
ATTORNEY

VARIABLE IMPEDANCE CIRCUIT

The demand for quality audio reproduction in entertainment radios has resulted in the use of emphasis networks in transmitters and deemphasis networks in receivers. In transmitting emphasis networks the signals at the higher audio frequencies are accentuated or emphasized, while those at the lower audio frequencies remain substantially unchanged before being injected into the audio frequency amplifier. There are two important reasons for using such emphasis circuitry. Firstly, it appears that the most disturbing noise in the audio frequency range lies between the 5 and 15 kc frequency. This is true of amplitude, phase and frequency modulated receivers. Consequently by emphasizing the audio frequencies above the 15 kc frequency the noise components are not emphasized and therefore a more pure audio signal is transmitted. Secondly, the useful signals in the upper audio frequency range are generally small. The provision of signal emphasis in the upper audio frequency range therefore raises the higher frequency levels to a more useful level.

If the original audio signal is to be reproduced in a receiver it is obvious that the effect of the emphasis in the transmitter must be adjusted for in the receiver. This is done by the use of a deemphasis network in the receiver. In this network the upper audio frequencies which have been emphasized in the transmitter are deemphasized by the same amount in the receiver before injection into the first audio amplifier stage.

Although these circuits work quite satisfactorily there are some inherent disadvantages. One of these disadvantages stems from the fact that the deemphasis network in the receiver works constantly irrespective of the level of signal received by the radio receiver. Consequently, as the signal-to-noise ratio of the receiver decreases when a weak signal is received the audio output from the receiver degradates and in many instances it is very objectionable for pleasant listening. Another disadvantage is the fact that the deemphasis network does not render the receiver immune to interference noise such as the ignition noise present in automobile radios.

It is therefore an object of this invention to provide a circuit which automatically varies the sensitivity of the audio output stage of a radio receiver.

It is another object to provide such a circuit in which the audio stage sensitivity remains constant for signals below a predetermined threshold level and automatically varies as a function of the current through a voltage sensitive switch above said predetermined level.

It is another object to provide such a circuit in which the impedance between the output of the deemphasis circuit ordinarily present in radio receivers and ground varies in accordance with the input signal level above a predetermined threshold to thereby improve the signal-to-noise ratio of the receiver.

It is another object to provide such a circuit having an effective high cut off action above a predetermined level of input signal.

Further objects, features and advantages of the invention will become apparent from the following description and claims when read in view of the accompanying drawings, wherein like numbers indicate like parts and in which:

Figures 1, 2:
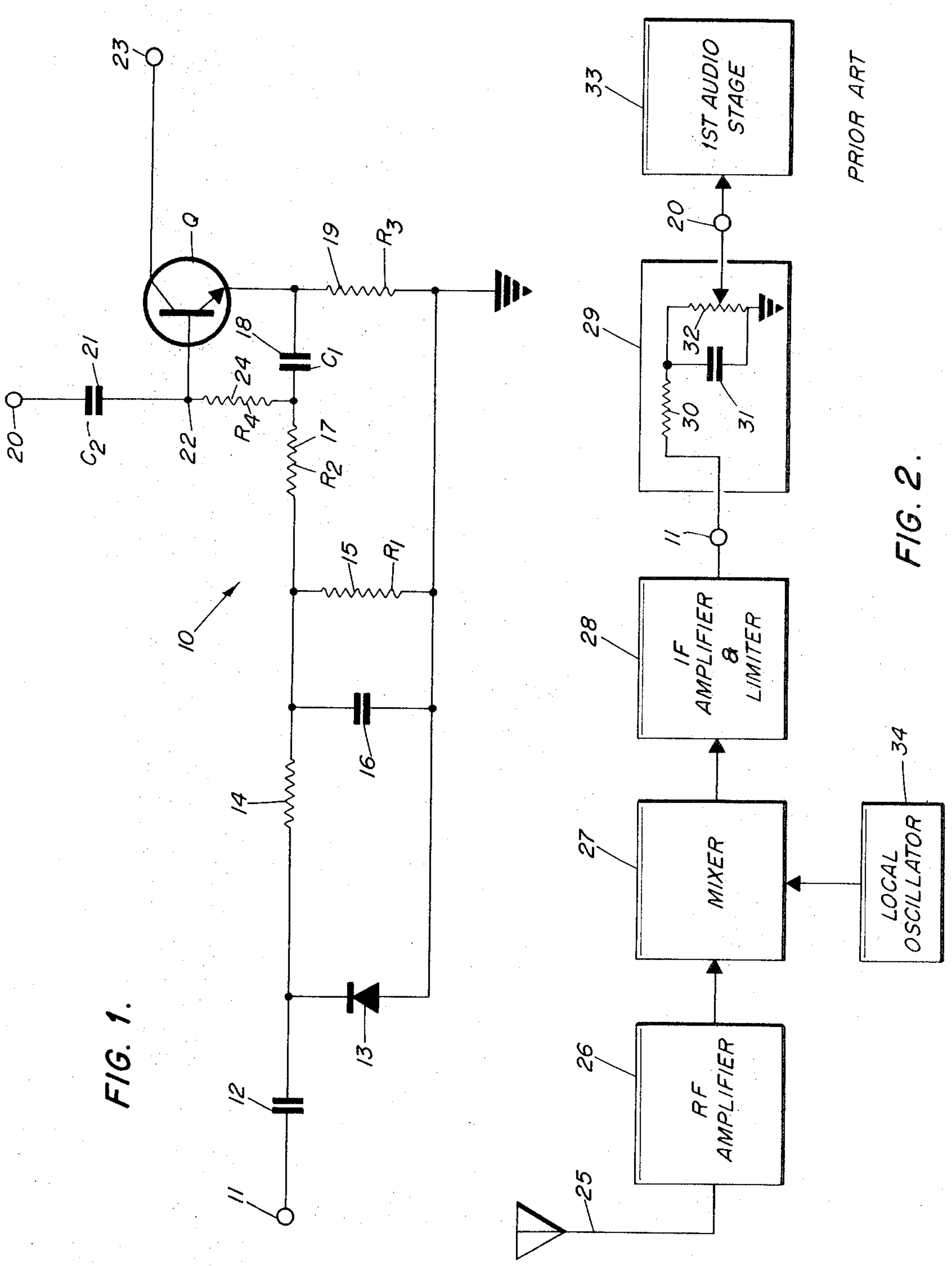
FIG. 1 shows a simplified schematic diagram of the inventive circuit.
FIG. 2 is a block diagram of the type of radio receiver presently used in the prior art utilizing a deemphasis network.

The incorporation of the inventive circuit into the prior art type receivers can be best understood by reference to FIG. 2. In FIG. 2 the radiofrequency Amplifier 26, Mixer 27, IF Amplifier and Limiter 28 and Local Oscillator 34 are the same components ordinarily used in radio receivers. As seen in the figure the output of the IF Amplifier 28 stage is injected into the first audio Amplifier Stage 33 through a deemphasis circuit 29. Deemphasis network 29 includes a resistor 30, capacitor 31 and potentiometer 32. Potentiometer 32 provides an adjustment for bringing about the best upper audio frequency emphasis. It should be noted that the input and output terminals of deemphasis network 29 are respectively labeled 11 and 20. Reference to FIG. 1 shows that the inventive circuit is also coupled across these two terminals.

The inventive circuit includes a coupling capacitor 12 and a diode 13 which is coupled between the output of the capacitor 12 and ground. Diode 13 is used to short exceptionally high positive interference signals to ground to prevent spurious firing of transistor Q. The junction of capacitor 12 and diode 13 is connected to a deemphasis network composed of resistors 14 and 15 and capacitor 16. This deemphasis circuit follows the same 75 microsecond curve as the deemphasis circuit 29 shown in FIG. 2 and therefore a substantially distortion free signal is injected into the audio stage when the transistor Q is a nonconductive stage. A capacitor 21 is connected between the terminal 20 and junction 22. The base of the transistor Q is also coupled to junction 22. The collector of transistor Q is connected to terminal 23 which would be connected to a positive bias source. The emitter of transistor Q is connected to ground through a resistor 19. Junction 22 is connected to ground through a network of resistors including resistors 24, 17 and 15.

When the input signal present on terminal 11 is below a level sufficient to fire transistor Q junction 22 is grounded through the impedance network composed of resistors 15, 17 and 24. However, when the input signal rises above a level sufficient to fire transistor Q junction 22 is also grounded through the transistor and resistor 19. The effect of the conduction and nonconduction of transistor Q can be best understood by considering the following mathematical analysis.

With transistor Q nonconductive the AC impedance ($Z_A$) from junction 22 to ground is:

$$Z_A = R_4 + \frac{(X_C+R_3)(R_1+R_2)}{X_C+R_1+R_2+R_3} \quad (1)$$

$X_C$=capacitive reactance of $C_1$; therefore, if $X_C<<R_3$ at higher audio frequencies and if $R_3<<R_2$, then $Z_A \approx R_4+R_3$. (2) With transistor Q conductive the AC impedance ($Z_B$) from junction 22 to ground, when letting $R_{in}$=the input impedance of Q, and $B$=the current gain of transistor Q is:

$$Z_B = \frac{R_4R_{in}}{R_4+R_{in}} + \frac{(X_C+R_3)(R_1+R_2)}{X_C+R_1+R_2+R_2}\left(B\frac{R_4}{R_4+R_{in}}\right) \quad (3)$$

if $X_C<<R_3$ at higher audio frequencies and if $R_3<<R_2$, and $R_{in}<7/8_4$, then:

$Z_B \approx R_{in}+R_3$. (4) The equation (4) clearly shows that the AC impedance from junction 22 to ground, when transistor Q is conducting, is a function of the transistor current gain. The signal-to-noise ratio varies with the deemphasis function and the deemphasis function varies with $\omega C_2/Z_B$ and therefore the varying of $Z_B$ increases the signal-to-noise ratio and improves the operation of the receiver. It is also evident that by properly selecting the value of capacitor 21 an effective high cutoff action as a function of input level can be achieved, and interference rejection is obtained by the cutoff action of transistor Q for weak signals.

Capacitor 18 offers a much higher reactance at lower audio frequencies than at the higher audio frequencies and thereby assures that these frequencies have a higher impedance path to ground irrespective of the condition of transistor Q.

Although this invention has been described with respect to particular embodiments thereof, it is not to be so limited as changes and modifications may be made therein which are within the spirit and scope of the invention as defined by the appended claims.

I claim:

1. A variable impedance circuit comprising:

a fixed impedance network;

a variable impedance network connected electrically in parallel with said fixed impedance network; and means for connecting input signals to said impedance networks;

said variable impedance network including a transistor having a base and an emitter, said base providing the output of said variable impedance circuit;

said fixed impedance path including a first resistor connected between said means for connecting and ground; a second resistor connected between said first resistor and one end of a third resistor; the other end of said third resistor being connected to said base; the junction of said second resistor and said third resistor being connected to an RC high pass network;

said variable impedance path including said transistor and a fourth resistor connected between said emitter and ground.

2. The circuit of claim 1 wherein said means for connecting includes a diode, a capacitor, and a resistor; said resistor being connected between a first terminal of said diode and a first terminal of said capacitor, a second terminal of said diode and a second terminal of said capacitor being connected to ground.